United States Patent
Greenwood et al.

(10) Patent No.: US 6,751,087 B2
(45) Date of Patent: *Jun. 15, 2004

(54) LAYERED POLYMER ON ALUMINUM STACKED CAPACITOR

(75) Inventors: Mike Greenwood, Oregon City, OR (US); Steve Schiveley, Forest Grove, OR (US); Aaron J. Steyskal, Portland, OR (US); Peir Chu, Portland, OR (US); Tao Liu, University Place, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/373,154

(22) Filed: Feb. 24, 2003

(65) Prior Publication Data

US 2003/0137800 A1 Jul. 24, 2003

Related U.S. Application Data

(63) Continuation of application No. 09/922,965, filed on Aug. 6, 2001, now Pat. No. 6,590,762.

(51) Int. Cl.⁷ .............................................. H01G 4/228
(52) U.S. Cl. ...................................... 361/533; 361/528
(58) Field of Search .............................. 361/523, 528, 361/529, 532, 533, 540

(56) References Cited

U.S. PATENT DOCUMENTS

| | | | |
|---|---|---|---|
| 4,852,227 A | 8/1989 | Burks | 29/25.42 |
| 4,947,286 A | 8/1990 | Kaneko et al. | 361/321 |
| 5,626,729 A * | 5/1997 | Thompson et al. | 204/252 |
| 6,185,091 B1 * | 2/2001 | Tanahashi et al. | 361/529 |
| 6,215,647 B1 * | 4/2001 | Naito et al. | 361/303 |
| 6,407,904 B1 * | 6/2002 | Kuroda et al. | 361/303 |
| 2003/0026058 A1 * | 2/2003 | Greenwood et al. | 361/301.4 |

FOREIGN PATENT DOCUMENTS

EP  0936642  8/1999  ........ H01G/9/008

* cited by examiner

Primary Examiner—Dean A. Reichard
Assistant Examiner—Eric Thomas
(74) Attorney, Agent, or Firm—Schwegman, Lundberg, Woessner & Kluth, P.A.

(57) ABSTRACT

The present invention provides a capacitor having a plurality of layers of aluminum foil connected to a first electrical terminal of the capacitor and another plurality of layers of aluminum foil connected to a second electrical terminal of the capacitor. The layers of aluminum foil are separated by a polymer such as a conductive organic polymer, so that each layer of polymer physically separates a layer of aluminum foil connected to the first terminal from a layer of aluminum foil connected to the second terminal. In some such embodiments the aluminum foil may be etched to provide greater surface area and capacitance, and also may be oxidized to form a dielectric layer.

7 Claims, 3 Drawing Sheets

EVEN LAYERS

ODD LAYERS

LAYERED POLYMER ON ALUMINUM STACKED CAPACITOR

This application is a continuation of U.S. patent application Ser. No. 09/922,965, titled "Layered Polymer on Aluminum Stacked Capacitor", filed Aug. 6, 2001 now U.S. Pat. No. 6,590,762, which is incorporated herein by reference in its entirety.

FIELD OF THE INVENTION

The invention relates generally to electronic capacitors, and more specifically to foil stacked capacitors using aluminum and polymer.

BACKGROUND OF THE INVENTION

Electrical circuits often include capacitors for various purposes such as filtering, bypassing, power decoupling, and to perform other functions. High-speed digital integrated circuits such as processors and computer chipsets in particular typically perform best when the power supplied to the integrated circuit is filtered with a capacitor placed physically close to the integrated circuit.

Such power decoupling capacitors function to smooth out irregularities in the voltage supplied to the integrated circuits, and so serve to provide the integrated circuits with a more ideal voltage supply.

By placing the decoupling capacitors near the integrated circuit, parasitic impedances such as printed circuit board path resistance or inductance are minimized, allowing easy and efficient transfer of energy from the decoupling capacitor to the integrated circuit. Minimization of series resistance and inductance in the capacitor itself is also desirable for the same purposes, and results in a more efficient and desirable decoupling or bypass capacitor.

The internal series resistance of the capacitor is typically known as the Equivalent Series Resistance, or ESR. Similarly, internal series inductance is known as Equivalent Series Inductance, or ESL. Both of these parameters can be measured for a given capacitor, and are among the basic criteria used to select capacitors for applications such as integrated circuit power supply decoupling.

Past efforts to minimize ESL and ESR have included solutions such as using multiple types of capacitors in parallel or combination series-parallel configurations, configured to product the desired capacitance at the very low ESR and ESL levels required. For example, tantalum capacitors in the order of 4.7 uF in parallel with 0.01 uF ceramic chip capacitors were often sufficient for lower-speed digital logic circuits of previous decades. But, new high speed digital logic circuits such as high-performance computer processors require both greater capacitance because of the amount of power dissipated, and lower ESR and ESL because of the very high speeds at which the processors operate.

It is also desirable for capacitors to have a physically small size, so that they do not take an unduly large amount of printed circuit board space. This is why space efficient capacitor technologies such as tantalum and electrolytic capacitors are often implemented in circuits despite typically having relatively high inductance, resistance, dielectric absorption, and other unfavorable characteristics. Mitigation of unfavorable capacitor characteristics of electrolytic or tantalum capacitors often also requires use of parallel capacitors with more favorable characteristics as secondary or supplemental decoupling capacitors.

What is desired is a single capacitor design that provides low ESR and ESL with large capacitance, and that is physically compact.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention utilizes aluminum foil and conductive polymer in a stacked alternating layer configuration to provide low ESR and ESL parameters and high capacitance in a physically compact design. The present invention eliminates in some applications the need to use multiple capacitors in parallel to achieve the desired level of performance, and is therefore also more easily located near a processor or other device for bypass applications. The reduction in circuit board space and cost as well as increased decoupling performance and better performance at high clock rates.

Figure 1:
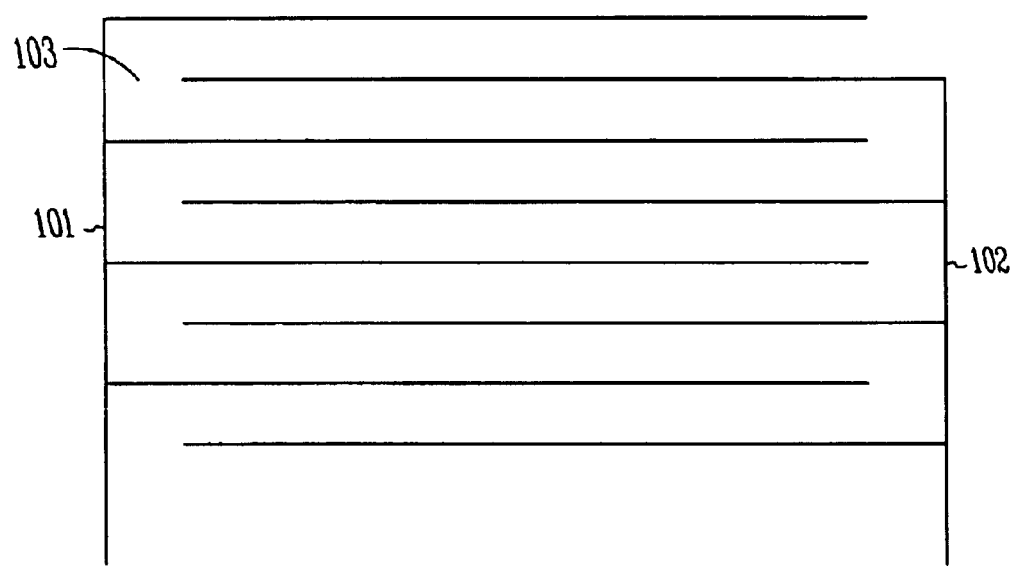
FIG. 1 shows a side view of a aluminum foil and polymer capacitor with opposing connected layers, consistent with an embodiment of the present invention.

FIG. 1 illustrates a stacked capacitor configuration, as may be used to practice the present invention. Electrical terminal 101 is connected to a first set of aluminum foil layers, each of which is separated from an aluminum foil layer in a second set connected to a second electrical terminal102 by a polymer 103. The polymer 103 may be an organic polymer, and in embodiments of the invention where aluminum foil layers of at least one pole are oxidized to form a dielectric barrier may be conductive polymers that are applied in contact with the foil layers. Because the polymer and foil construction of some embodiments of the invention does not have any polarity-specific features, the polarity of the first and second electrical terminals or poles of these embodiments is not determined by the capacitor design. These capacitors may therefore be electrically connected without regard to terminal polarity, unlike tantalum, electrolytic, and some other capacitor technologies commonly used in bypass or decoupling applications.

Figure 2:
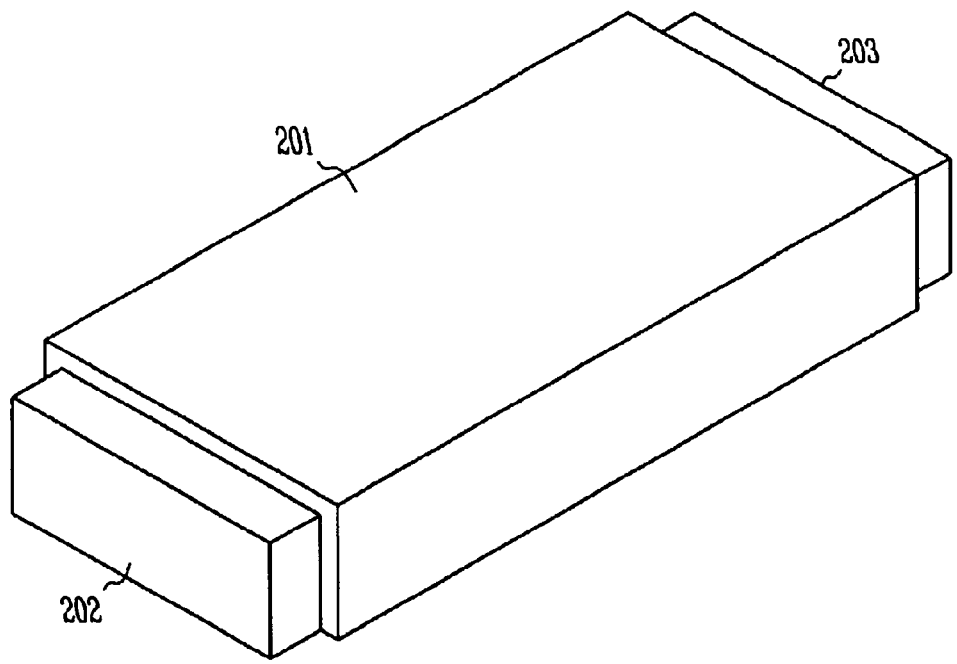
FIG. 2 shows a surface mount capacitor package, consistent with an embodiment of the present invention.

FIG. 2 shows a surface mount capacitor package, as may be used to implement some embodiments of the present invention. The capacitor is encased in a package 201 that may be a solid polymer, an epoxy, or other material that physically holds or supports the capacitive elements such as shown in FIG. 1. The capacitor is connected to external circuitry via electronic leads or terminations 202 and 203. Typically, such a capacitor will be placed on a printed circuit board and soldered via reflow soldering or a similar method to conductive pads and traces on the circuit board. The leads 202 and 203 in the present invention need not be polarized such that one particular lead must be connected to a positive voltage with respect to the other, but nevertheless may in some embodiments of the invention be polarized.

Figure 3A:
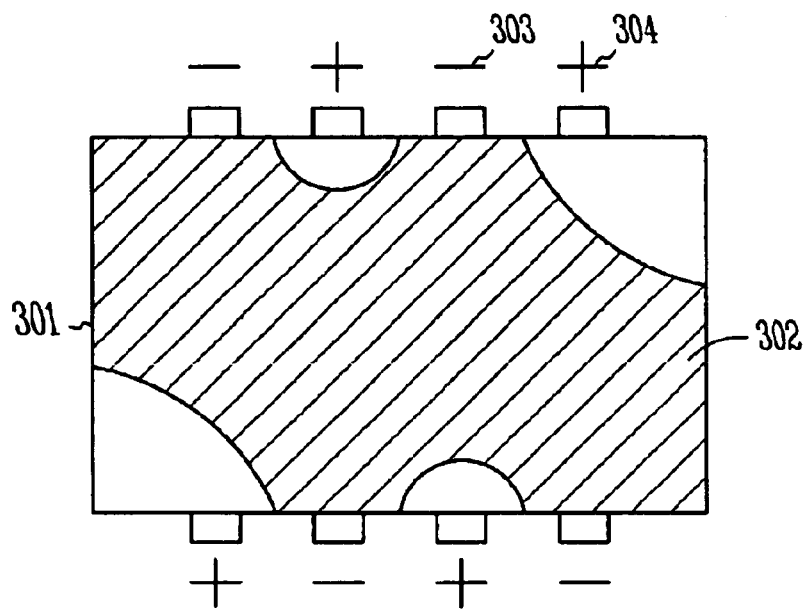
FIG. 3A shows a multitermination surface mount technology (SMT) capacitor package, consistent with an embodiment of the present invention.
Figure 3B:
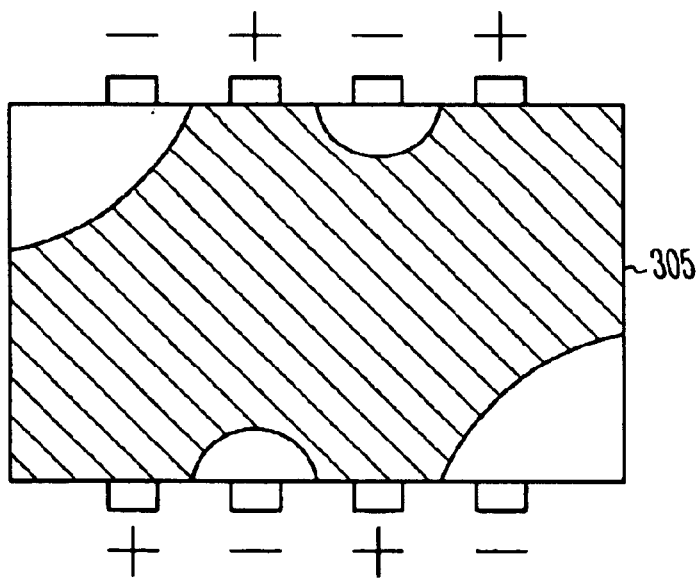
FIG. 3B shows a multitermination surface mount technology (SMT) capacitor package, consistent with an embodiment of the present invention.

FIG. 3 illustrates an advanced implementation of the present invention using a multiterminal surface mount technology (SMT) package to house and connect the capacitor. The eight-terminal SMT package is commonly used for housing multilayer ceramic capacitors, and so is a common form factor and easily integrated into printed circuit board designs. Other variations of such a package exist and are within the scope of this invention, such as a package having terminations on more than two sides of such a device. Similarly, larger packages such as a standard dual in-line package (DIP) may be used to house and connect the capacitor.

In the particular embodiment of the present invention illustrated in FIG. 3, the multiterminal SMT package 301 contains a conductive sheet of aluminum foil 302. The aluminum foil for any given layer is connected either to the positive terminals or to the negative terminals of the multiterminal SMT package, as shown at 301 and 305. At 301, the aluminum foil 302 is connected only to negative terminals such as shown at 303, and not to the positive terminals 304. At 305, an aluminum sheet of opposite polarity in the capacitor is connected only to positive terminals and not to negative terminals. Alternating positive and negative layers of aluminum foil are stacked on top of each other in alternating fashion, each separated by a polymer layer, forming a capacitor similar to the capacitor illustrated in FIG. 1.

The design of the capacitor of FIG. 3 is calculated to reduce the equivalent series inductance (ESL) of the capacitor, allowing it to provide current flow as a bypass capacitor more rapidly than other higher ESL designs. More specifically, the use of multiple terminals for the positive and negative connections to the corresponding alternating layers of aluminum foil in the capacitor reduces ESL, as does driving the alternating layers of foil in the capacitor in an opposite physical direction to the layers immediately above and below each layer of aluminum.

In some embodiments of the invention, the aluminum foil may be etched to increase the surface area of the aluminum foil. Application of a conductive polymer or organic polymer to the etched foil provides a conductive path between the alternating etched aluminum foil capacitive plates, and therefore facilitates a higher capacitance than would be possible using other technologies. Formation of aluminum oxide ($Al_2O_3$) or other dielectric on the aluminum foil layers of at least one pole of the capacitor provides the dielectric component of the capacitor, and the organic polymer effectively acts as an extension of a conductive pole of the capacitor. Further, such a capacitor configuration has the desirable property of self-healing, or self-forming a dielectric barrier in places within the capacitor where the dielectric is damaged or has imperfections and electricity is conducted between the poles of the capacitor.

The polymer of the present invention is deposited in some embodiments onto very thin aluminum foil, which may be cut into strips or other shapes such as shown in FIG. 3. These strips or shapes can be stacked in alternating layers, such that the alternating layers are attached alternately to a first or second terminal of the capacitor. The capacitors of the present invention need not be polarized, but in some embodiments may be polarized such that a positive terminal or anode must be connected to a higher voltage than a negative terminal or cathode.

Because the capacitor of the present invention is configured in a flat package configuration with multiple layers of foil connected to each pole, it may be packaged in a number of other common format packages traditionally used for other purposes. Examples include EIA spec MLCC or tantalum format capacitor-style packages, which are typically used for various other capacitor technologies such as stacked ceramic and tantalum capacitors. Other multiterminal packages having more than two terminals may again be utilized to provide multiple connections to each pole of the capacitor, providing potential benefits in realized ESL and ESR reduction.

Figure 4:
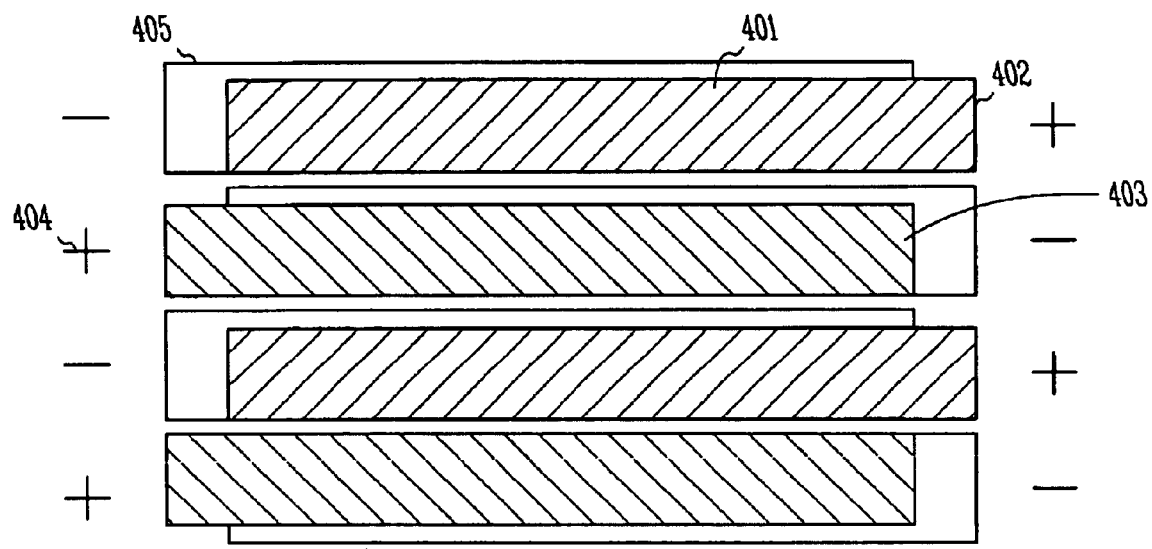
FIG. 4 shows an aluminum foil and polymer capacitor having multiple conductive aluminum foil strips per layer, consistent with an embodiment of the present invention.

FIG. 4 illustrates another possible configuration consistent with the present invention, including separating aluminum strips and driving alternating strips within a single layer from different pole connection points, further reducing ESL over configurations such as are shown in FIG. 1. For each strip of a certain layer and pole such as 401, which is connected here to positive pole 402, at least one neighboring strip 403 is connected to a pole of the same polarity but on the opposite side of the capacitor such as 403 is connected to pole 404.

Figure 5:
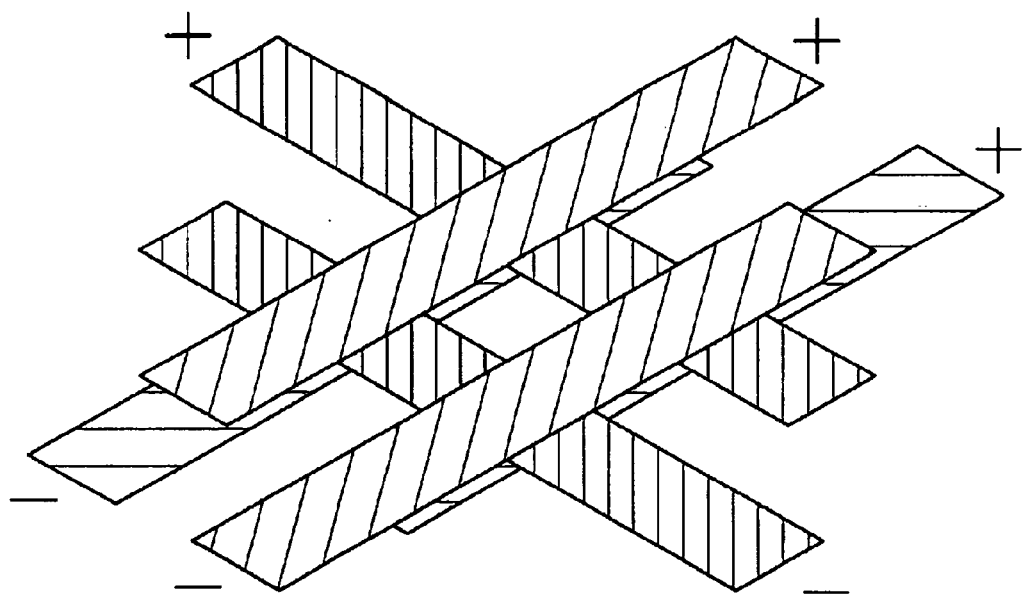
FIG. 5 shows an aluminum foil and polymer capacitor having multiple conductive aluminum foil strips per layer and further having alternate orientation of adjacent layers of aluminum foil strips, consistent with an embodiment of the present invention.

In this example, the layer immediately above or below the layer having strips 401 and 403 connected to positive poles comprises similarly alternating strips connected to negative poles. More specifically, strip 405 is directly under strip 401, and is separated only by the organic polymer and by the aluminum oxide dielectric on at least one of the strips. Strip 405 is opposite in polarity from strip 401, and is connected to a pole at the strip end opposite the end to which strip 401 is connected to its respective opposite pole. The terminals and alternating foil layers are not restricted to only two sides of a package or to two orientations using this format. For example, alternating and electrically opposing strips may be arranged or woven into a four-sided format such as is illustrated generally in FIG. 5 to further reduce ESL.

These configurations utilize multiple terminals for the positive and negative connections to the corresponding alternating layers and strips of aluminum foil in the capacitor, and therefore reduces the ESL of the capacitor. Also, driving the alternating layers of foil in the capacitor in an opposite physical direction to the layers immediately above and below each layer of aluminum further reduces ESL, making such a configuration more able to quickly provide change in current flow to attached devices when used as a bypass capacitor in high-speed digital circuits or in other high-frequency applications.

Because the various embodiments of the invention address the need for reduced ESL and ESR in small capacitors of high capacitance by utilizing multiple individual layers of aluminum foil connected to each pole, the present invention provides a valuable improvement over previous known capacitors. Use of a conductive polymer, etched aluminum foil layers, and aluminum oxide on a surface of the aluminum foil layers of at least one pole as a dielectric in some embodiments further increases the capacitance and volumetric efficiency of the present invention, making it particularly desirable for bypass applications in high power, high speed circuits.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A capacitor, comprising:
   a first plurality of layers of aluminum foil connected to a first electrical terminal of the capacitor;
   a second plurality of layers of aluminum foil connected to a second electrical terminal of the capacitor; and
   a layer of conductive polymer separating each layer of aluminum foil, such that each layer of polymer physically separates one of said layers of aluminum foil connected to the first terminal from one of said layers of aluminum foil connected to the second terminal;
   wherein the first electrical terminal and the second electrical terminal are on opposing sides of a capacitor package containing the first and second pluralities of layers of aluminum foil, and wherein the first electrical terminal is disposed opposite the second electrical terminal, directly across the capacitor body.

2. The capacitor of claim 1, wherein the layers of aluminum foil and polymer are fixed in a flat configuration.

3. The capacitor of claim 1, wherein the capacitor is bipolar.

4. The capacitor of claim 1, wherein the layers of aluminum foil and polymer are fixed in a multiterminal package format.

5. The capacitor of claim 1, wherein the layers of aluminum foil and polymer are fixed in a surface mount capacitor configuration.

6. The capacitor of claim 1, wherein the polymer is a conductive organic polymer.

7. A capacitor, comprising:
   a first plurality of layers of aluminum foil connected to a first electrical terminal of the capacitor;
   a second plurality of layers of aluminum foil connected to a second electrical terminal of the capacitor; and
   a layer of conductive polymer separating each layer of aluminum foil, such that each layer of polymer physically separates one of said layers of aluminum foil connected to the first terminal from one of said layers of aluminum foil connected to the second terminal;
   wherein the first electrical terminal and the second electrical terminal are on opposing sides of a capacitor package containing the first and second pluralities of layers of aluminum foil;
   wherein the layers of aluminum foil and polymer are fixed in a multiterminal package format; and
   wherein the first electrical terminal of the capacitor comprises at least two alternating pins of the multiterminal package, and wherein the second electrical terminal of the capacitor comprises at least two alternating pins of the multiterminal package.

* * * * *